(12) United States Patent
Studnicka et al.

(10) Patent No.: US 11,449,868 B2
(45) Date of Patent: Sep. 20, 2022

(54) VOICE ACTIVATED REMITTANCES

(71) Applicant: PAYPAL, INC., San Jose, CA (US)

(72) Inventors: Todd Studnicka, San Jose, CA (US); Adhish Vyas, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 1053 days.

(21) Appl. No.: 15/284,391

(22) Filed: Oct. 3, 2016

(65) Prior Publication Data
US 2018/0096355 A1    Apr. 5, 2018

(51) Int. Cl.
| G06Q 20/40 | (2012.01) |
| G06Q 20/02 | (2012.01) |
| G06Q 20/10 | (2012.01) |
| G06Q 20/30 | (2012.01) |
| G06Q 20/38 | (2012.01) |

(52) U.S. Cl.
CPC ..... *G06Q 20/40145* (2013.01); *G06Q 20/027* (2013.01); *G06Q 20/108* (2013.01); *G06Q 20/305* (2013.01); *G06Q 20/388* (2013.01)

(58) Field of Classification Search
CPC .......................... G06Q 20/40145; G06Q 20/10
USPC ......................................................... 705/44
See application file for complete search history.

(56) References Cited

U.S. PATENT DOCUMENTS

| 8,694,315 | B1 | 4/2014 | Sheets et al. | |
| 9,406,089 | B2* | 8/2016 | Mori | G06F 40/174 |
| 9,781,105 | B2* | 10/2017 | Weiner | H04L 63/0853 |
| 2007/0219871 | A1 | 9/2007 | Rolf et al. | |
| 2009/0070263 | A1* | 3/2009 | Davis | G06Q 20/32 705/44 |
| 2010/0030557 | A1 | 2/2010 | Molloy et al. | |
| 2010/0082481 | A1* | 4/2010 | Lin | G06Q 20/32 705/41 |
| 2010/0158207 | A1 | 6/2010 | Dhawan et al. | |
| 2010/0225443 | A1 | 9/2010 | Bayram et al. | |
| 2010/0250231 | A1 | 9/2010 | Almagro | |
| 2011/0224981 | A1 | 9/2011 | Miglietta et al. | |
| 2011/0270052 | A1 | 11/2011 | Jensen et al. | |
| 2012/0122577 | A1 | 5/2012 | Aronzon | |
| 2013/0124416 | A1* | 5/2013 | Pawar | G06Q 20/02 705/44 |

(Continued)

OTHER PUBLICATIONS

Chloe Clavel, Spontaneous speech and opinion detection: mining call-centre transcripts, Dec. 2013, Springer Science+Business Media Dordrecht 2013, Journal Article (1089-1125) (Year: 2013).*

(Continued)

*Primary Examiner* — Benjamin S Brindley
(74) *Attorney, Agent, or Firm* — Haynes and Boone, LLP

(57) ABSTRACT

A system is provided for voice activated remittances. The system may perform operations that include receiving at least one audio stream corresponding to a real-time voice communication between a first user and a second user and identifying, based on the at least one audio stream, a set of words. The operation may also include determining that the set of words indicates a desired payment transaction between the first user and the second user and determining a payment amount to be remitted from the first user to the second user. Further the operations may include causing the payment amount to be remitted from a first financial account corresponding to the first user to a second financial account corresponding to the second user.

20 Claims, 6 Drawing Sheets

(56) References Cited

U.S. PATENT DOCUMENTS

| | | |
|---|---|---|
| 2013/0239173 A1 | 9/2013 | Dispensa |
| 2013/0290136 A1* | 10/2013 | Sheets ................. G06Q 20/4016 |
| | | 705/26.35 |
| 2014/0046842 A1* | 2/2014 | Irudayam .............. G07F 19/202 |
| | | 235/379 |
| 2014/0244496 A1 | 8/2014 | Langus et al. |
| 2014/0254778 A1* | 9/2014 | Zeppenfeld ......... H04M 3/5183 |
| | | 379/88.02 |
| 2014/0279457 A1* | 9/2014 | Green .................... G06Q 20/10 |
| | | 705/40 |
| 2014/0325220 A1 | 10/2014 | Tunnell et al. |
| 2014/0372301 A1 | 12/2014 | Anamanamuri |
| 2014/0372308 A1 | 12/2014 | Sheets |
| 2015/0026351 A1 | 1/2015 | Calman et al. |
| 2015/0186892 A1* | 7/2015 | Zhang .................. G06Q 20/326 |
| | | 705/44 |
| 2015/0269422 A1 | 9/2015 | Wada |
| 2015/0269945 A1 | 9/2015 | Taylor et al. |
| 2015/0278820 A1* | 10/2015 | Meadows ........ G06Q 20/40145 |
| | | 705/64 |
| 2016/0007195 A1* | 1/2016 | Goldstone ......... H04M 3/42059 |
| | | 455/411 |
| 2016/0293180 A1 | 10/2016 | Ur et al. |
| 2017/0330183 A1* | 11/2017 | Modi ................. G06Q 20/3226 |
| 2017/0352032 A1* | 12/2017 | Mohsenzadeh .... G06Q 30/0241 |
| 2018/0075426 A1 | 3/2018 | Fisher |

OTHER PUBLICATIONS

Ahmed N. et al., "Discrete Cosine Transform" (PDF), IEEE Transactions on Computers, C-23 (1), doi: 10.1109/T-C.1974.223784, Jan. 1974, pp. 90-93.

Gray M., "Linear Predictive Coding and the Internet Protocol A survey of LPC and a History of Real-time Digital Speech on Packet Networks", 2010, 96 pages.

International Appl. No. PCT/US2017/054349, International Search Report and Written Opinion dated Dec. 7, 2017, 6 pages.

The Use of FFT and MDCT in MP3 Audio Compression by Guckert, 2012, 13 pages.

* cited by examiner

VOICE ACTIVATED REMITTANCES

BACKGROUND

During an audio conversation between a first person and a second person (e.g., a phone conversation), the subject of remittance may arise. For example, a remittance from the first person to the second person may be desired (e.g., the first person would like to pay the second person and/or the second person may desire payment from the first person).

Figure 1:
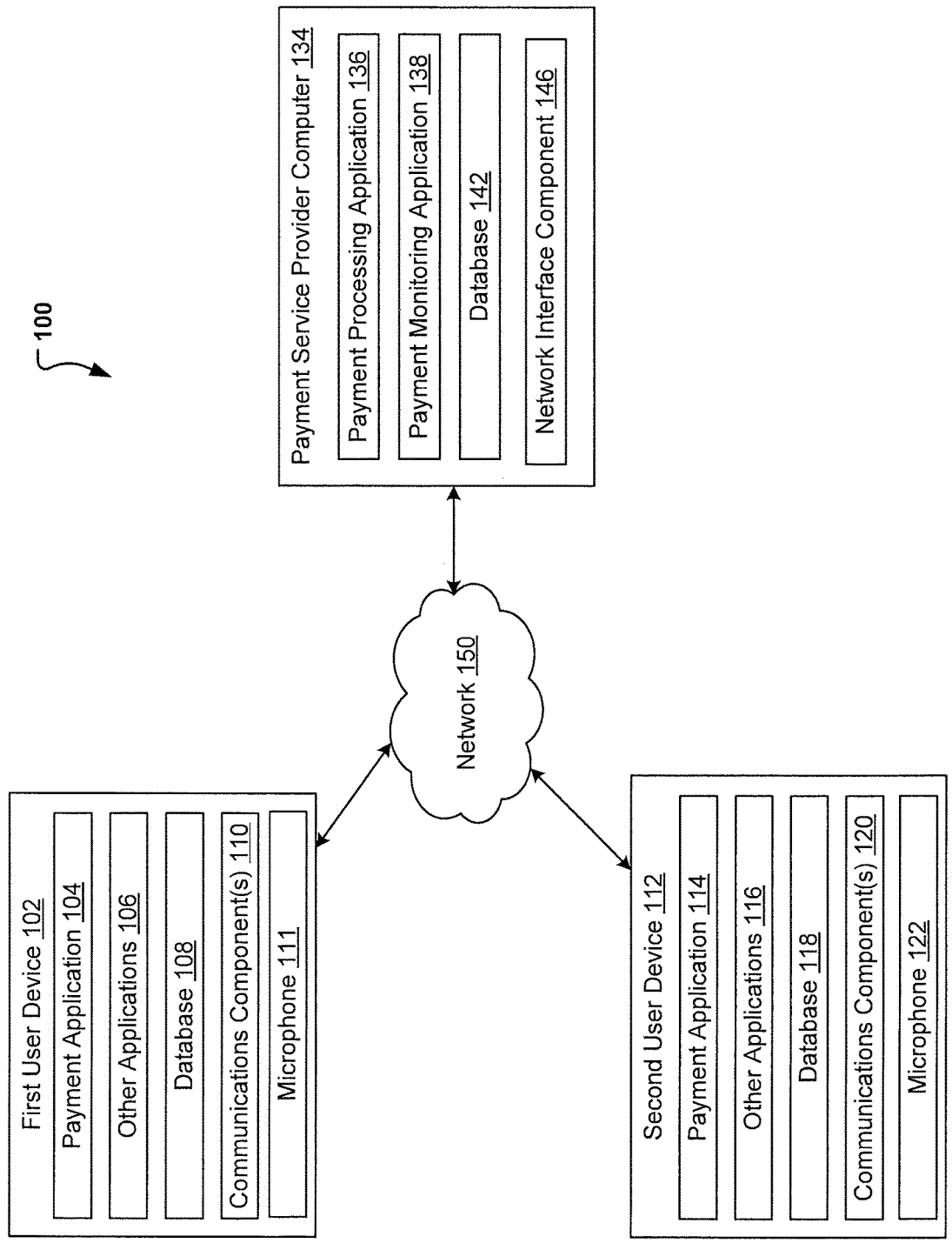
FIG. 1 is a block diagram of a networked system suitable for implementing the processes described herein for voice activated remittances, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Systems and methods are provided for voice activated remittances. In a particular embodiment, a system includes a first user device, a second user device, and a payment service provider computer of a payment service provider. The payment service provider may processes retail payment transactions between users and merchants, peer-to-peer payment transactions between users, and/or any other type of payment transactions. The first user device, the second user device, and the payment service provider computer may be in communication with each other via a network. The first user device and the second user device may also be in direct communication with each other and/or communicate over a different network (e.g., a cellular communication link).

According to certain embodiments, a first user of to the first user device may participate in a real-time voice communication with a second user of the second user device via communication between the first user device and the second user device. The real-time voice communication may correspond to a phone communication (e.g., via a landline and/or cellular network), a Voice over Internet Protocol (VoIP) communication, and/or any other type of voice communication protocol. The first user device may receive, generate, and/or otherwise access an audio stream corresponding to the real-time voice communication between the first user and the second user.

A payment application may be used to monitor the real-time voice communication for a desired payment transaction between the first user and the second user. The payment application may be stored in the first user device, the second user device, the payment service provider, and/or any other device in communication with the system. Further, the payment application may be an application provided and maintained by the payment service provider to facilitate payment transactions and/or other financial transactions by users of the payment application. In a particular embodiment, the payment application may be provided by payment PAYPAL®, Inc. of San Jose, Calif., USA and may be downloaded to the first user device from an application repository, such as an app store.

In a particular embodiment, the payment application may be configured to analyze the audio stream to identify a set of words spoken during the real-time voice communication. For example, the payment application may provide the audio stream to a speech analysis application. The speech analysis application may be executed to generate a text translation (or any other type of translation to computer-readable data) corresponding to the real-time voice communication. The speech analysis application may identify the set of words based on the text translation. Further, the payment application may determine that the set of words correspond to trigger information that indicates a desired payment transaction between the first user and the second user. For example, words that include numbers, words such as "pay," "owe," "money," "dollars", phrases such as "can you send me money?," and/or other words, phrases, or sentences may correspond to the trigger information. It will be appreciated that various words and phrases of various languages may be determined to correspond to the trigger information.

Based on the identified set of words, the payment application may determine that payment is to be remitted from first user to the second user. For example, the payment application may determine that the first user desires a transfer of money to the second user. As another example, the payment application may determine that the second user is requesting money from the first user. Additionally, the payment application may determine, based on the identified set of words, a payment amount to be remitted from the first person to the second person.

Before initiating remittance from the first user to the second user, the payment application may be configured to request an authorization from the first user to remit the payment amount to the second user. For example, the payment application may determine whether the first user device is authenticated with respect to the first user. According to certain embodiments, the payment application may determine whether the first user device is authenticated based on voice information. For instance, the payment application may extract, from the audio stream, voice information corresponding to the first user (e.g., via a microphone 111 included in the first user device). The payment application may then compare the extracted voice information with stored voice information corresponding to the first user. If the payment application determines, based on the comparison, that a voice similarity value between the extracted voice information and the stored voice information is greater than or equal to a voice similarity threshold, the payment application may determine that the first user device has been successfully authenticated with respect to the first user. In other embodiments, the payment application may determine whether the first user device is authenticated based on biometric information corresponding to the first user It will be appreciated that other methods of authenticating the first user with the first account information are also contemplated, such as usage of biometric data, passwords, and/or the like. For example, the payment application may receive input biometric information from the first user. In certain implementations, the input biometric information may be received via a biometric sensor included in the first user device. The payment application may perform a comparison between the input biometric information and stored biometric information associated with the first user. Further, the payment application may determine whether a biometric similarity between the input biometric information and the stored biometric information is greater than or equal to a biometric similarity threshold. If the biometric similarity is greater than or equal to a biometric similarity threshold, the payment application may determine a successful authentication between the first user and the first account information.

Upon determining that the first user device is authenticated with respect to the first user, the payment application may generate and/or display a notification that indicates a request for the first user to authorize remittance of the payment amount. In response to a successful authorization (e.g., receiving an authorization from the first user), the payment application may determine first account information corresponding to the first user and second account information corresponding to the second user. Further, the payment application may also determine whether the first user and/or the second user is registered with the payment service provider. In other embodiments, the payment application may determine whether the desired payment transaction is authorized and/or authenticated by receiving an authorization indication from the first user device and determining whether the authorization indication was received during a period of time in which the first user device was authenticated with respect to the first user.

According to a particular embodiment, the payment application may determine that the first user is registered with a first financial account provided by the payment service provider. For example, the payment application may determine that the first account information corresponds to the first financial account provided by the payment service provider. Further, if the payment application determines that the second user is registered with the payment service provider (e.g., whether the second user is registered with a second financial account provided by the payment service provider), the payment application may cause the payment amount to be remitted from the first financial account to the second financial account.

If the payment application determines that the second user is unregistered with the payment service provider, the payment application may transmit, to the second user device, a request to register with the payment service provider. For example, the request may be transmitted via a text message (e.g., a short message service (SMS) message) that includes instructions indicating how the second user can register with the payment service provider. In certain embodiments, if the second user registers for a second account with the payment service provider, the payment application may identify the second account information corresponding to the second account. In other embodiments, the payment application may receive an indication (e.g., via the second user device) that second user declines to register with the payment service provider. In response, the payment application may transmit a second request (e.g., to the second user device) for the second user to input second account information to receive the payment amount from the first user. In yet other embodiments, in response to determining that the second user is unregistered with the payment service provider, the payment application may transmit a request (e.g., to the second user device) for the second user to input second account information without requesting that the second user register with the payment service provider.

The payment application may cause the payment amount to be remitted from the first financial account to the second financial account. According to a particular embodiment, the payment application may cause the payment service provider computer to perform and/or otherwise facilitate the remittance. For example, if both the first financial account and the second financial account are provided by the payment service provider, the remittance may be performed via a closed-loop transaction by the payment service provider computer.

FIG. 1 is a block diagram of a networked system 100 for implementing the processes described herein, according to an embodiment. As shown, system 100 may include or implement a plurality of devices, computers, servers, and/or software components that operate to perform various methodologies in accordance with the described embodiments. Example devices, computers, and servers may include mobile devices, stand-alone devices, desktop computers, laptop computers, and enterprise-class servers, executing an operating system (OS) such as a MICROSOFT® OS, a UNIX® OS, a LINUX® OS, or another suitable device and/or server based OS. It will be appreciated that the devices, computers, and/or servers illustrated in FIG. 1 may be deployed differently and that the operations performed and/or the services provided by such devices, computers, and/or servers may be combined or separated for a given embodiment and may be performed by a greater number or fewer number of devices, computers, and/or servers. Furthermore, one or more of the devices, computers, and/or servers may be operated and/or maintained by the same or different entities.

System 100 includes a first user device 102, a second user device 112, and a payment service provider computer 134 in communication over a network 150. The first user device 102, second user device 112, and the payment service provider computer 134 may each include one or more processors, memories, and other appropriate components for executing computer-executable instructions such as program code and/or data. The computer-executable instructions may be stored on one or more computer readable mediums or computer readable devices to implement the various applications, data, and steps described herein. For example, such instructions may be stored in one or more computer readable media such as memories or data storage devices internal and/or external to various components of system 100, and/or accessible over network 150.

The first user device 102 may be implemented as a communication device that may utilize appropriate hardware and software configured for wired and/or wireless communication with the second user device 112 and/or payment service provider computer 134. For example, in one embodiment, the first user device 102 may be implemented as a personal computer (PC), a smart phone, laptop/tablet computer, point-of-sale device, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from Apple®. The first user device 102 may correspond to and be utilized by a first user. Although only one first user device 102 is shown, a plurality of first user devices may function similarly.

The first user device 102 may include one or more payment applications 104, other applications 106, a database 108, and communication components 110. The payment applications 104 and other applications 106 may correspond to executable processes, procedures, and/or applications with associated hardware. In other embodiments, first user device 102 may include additional or different components having specialized hardware and/or software to perform operations associated with the payment applications 104 and/or the other applications 106.

The payment application 104 may be provided and maintained by a payment service provider associated with the payment service provider computer 134. In certain embodiments, the payment application 104 may correspond to a mobile application downloaded from an app store (e.g., Apple® App Store, Google® Play, Windows® Phone Store, and/or the like). Furthermore, the payment application 104 may facilitate financial transactions, such as payment transactions between users and/or payment transactions corresponding to a sale of goods services provided by a merchant to a user. For example, the payment application 104 may provide an interface to enable a peer-to-peer remittance between a first user of the first user device 102 and a second user of the second user device 112. In particular, the payment application 104 may communicate with a payment processor (e.g., such as a payment processing application executed by the payment service provider computer 134). The payment processor may transfer a payment amount to be between a first account associated with the first user and a second account associated with the second user. The payment application 104 may also facilitate other types of financial transactions associated with banking, online payments, money transfers, and/or the like.

According to certain embodiments, a first user of the first user device 102 may participate in a real-time voice communication with a second user of the second user device 112 via the first user device 102 and the second user device 112, respectively. For example, the real-time voice communication may correspond to a cellular network communication, a VoIP communication, a Wi-Fi call, and/or any other type of voice communication between the first user device 102 and the second user device 112. The payment application 104 may receive, monitor, and/or otherwise access one or more audio streams corresponding to the real-time voice communication between the first user device 102 and the second user device 112. Further, the payment application 104 may analyze the one or more audio streams, and based on the analysis, the payment application 104 may identify a set of words spoken during the real-time voice communication. The payment application 104 may determine whether the set of words indicates a desired payment transaction between the first user and the second user.

According to a particular embodiment, the one or more audio streams include a first audio stream and a second audio stream. The first audio stream may be captured and/or otherwise received by a microphone 111 included in the first user device 102. The first audio stream may be provided to the payment application 104, such as via the microphone 111. As such, the payment application 104 may determine that the first audio stream corresponds to voice communication by the first user. The second audio stream corresponding to voice communication by the second user may be transmitted by the second user device 112 to the first user device 102. The second audio stream may be received by a transceiver included in the first user device 102. In certain implementations, the payment application 104 may determine, based on an identifier included in the second audio stream, that the second audio stream corresponds to voice communication by the second user. The microphone 111 and the transceiver may be included in the communications components 110 of the first user device 102, as described in further detail below.

In order to determine the set of words spoken during the real-time voice communication, the payment application 104 may perform speech analysis with respect to the one or more audio streams. According to certain embodiments, the payment application 104 may execute a speech analysis application to generate a translation of the audio stream to computer-readable data (e.g., a text translation). To this end, the speech analysis application may identify the set of words based on the translation. Further, the payment application 104 may perform a comparison between the identified set of words and a stored set of words. The stored set of words may be stored in the first user device 102, payment service provider computer 134, and/or any other storage device. Further, the stored set of words may correspond to "trigger words" that indicate a desired payment transaction. For example, the stored set of words may include numbers, words such as "pay," "owe," "money," "dollars", phrases such as "can you send me money?," "I would like to send you money," and/or any other words or phrases (e.g., of any language) that indicate a desired payment transaction. Thus, the trigger words may include words that represent a request for payment and/or a desire to send payment. Further, the trigger words may be previously stored on the first user device 102, such as in the database 102 and/or on any other storage device, such as a storage device included in the payment service provider computer 134. Based on the comparison, the payment application 104 may determine a similarity value between the identified set of words and the stored set of words. If the payment application 104 determines that the similarity value is greater than or equal to a similarity threshold, the payment application 104 may determine that the identified set of words indicates a desired payment transaction between the first user and the second user.

The payment application 104 may also determine, based on the identified set of words, a payment sender and a payment recipient corresponding to the desired payment transaction between the first user and the second user. In other words, the payment application 104 may determine if money is to be transferred from the first user to the second user or from the second user to the first user. For example, if the payment application 104 identifies that the first user has spoken the words "please pay me $5" in the real-time voice communication with the second user, the payment application 104 may determine that the first user corresponds to the payment recipient and that the second user corresponds to the payment sender. Similarly, if the payment application 104 identifies that the first user has spoken the words "I would like to send you $5," the payment application 104 may also determine that the first user corresponds to the payment recipient and that the second user corresponds to the payment sender. Thus, the payment application 104 may facilitate desired payment transactions that represent both requests for money and desires to send money.

Furthermore, the payment application 104 may determine a payment amount to be transferred between the first user and the second user. In a particular embodiment, the payment application 104 may determine the payment amount based on the identified set of words spoken during the real-time voice communication. According to another embodiment, the payment application 104 may transmit, to the payment sender (e.g., or a device associated with the payment sender), a request to input the payment amount corresponding to the desired payment transaction. According to yet another embodiment, the payment application 104 may transmit the request to input the payment amount if the payment application 104 cannot determine the payment amount based on the identified set of words.

The payment application 104 may also determine whether the desired payment transaction is authorized by the first user and whether the first user is authenticated with the first user device 102. For example, upon determining the desired payment transaction and the payment amount, the payment application 104 may generate a notification (e.g., via a push notification, an email notification, a text message notification, and/or the like) to request authorization from the first user to proceed with the desired payment transaction. In response to the request, the payment application 104 may receive an authorization indication (e.g., via an input by the first user) that indicates the desired payment transaction is authorized by the first user. In response to receiving the authorization indication, the payment application 104 may also determine whether the authorization indication was received during a period of time in which the first user device 102 was authenticated with respect to the first user.

According to certain embodiments, the first user device 102 may be authenticated with the first user based on an authentication process. For example, the payment application 104 may perform the authentication process using biometric data. The biometric data may include voice information, fingerprint information, retina scanning information, and/or any other type of biometric information. For instance, the payment application 104 may request the first user to input first biometric data (e.g., via a push notification, a pop-up notification, and/or like displayed by the first user device 102). In response to receiving the first biometric data, the payment application 104 may compare the first biometric data with previously stored biometric data corresponding to the first user. Based on the comparison, the payment application 104 may determine a biometric similarity value. If the payment application 104 determines that the biometric similarity value exceeds a biometric threshold, the payment application 104 may determine that the first user device 102 is authenticated with respect to the first user.

It will be appreciated that the authentication process may be performed at any time before, during, and/or after receiving the authorization indication. For example, the authentication process may be performed during initialization of the payment application 104, such as during a login event. Under this scenario, the authentication may be valid for a certain period of time, which may be predetermined and/or which may be based on occurrences of one or more exceptions (e.g., the authentication is valid until the first user device 102 is locked, a display of the first user device 102 is deactivated, the first user device 102 is deactivated, and/or the like). In other implementations, the authentication process may be performed in response to receiving the authorization indication. For instance, upon receiving the authorization indication, the payment application 104 may request input of biometric data from the first user and perform a comparison of the input biometric data with stored biometric data, as described above.

According to certain embodiments, the payment application 104 may also determine whether the desired payment transaction is authorized by the second first user and whether the second user is authenticated with the second user device 112. For example, the payment application 104 may receive a second authorization indication, from the second user device 112, that indicates the desired payment transaction is authorized by the second user. Further, the payment application 104 may determine that the second authorization indication is received during a period of time in which the second user device 112 is authenticated with the second user. For example, the second user device 112 may be authenticated with respect to the second user based on a second authentication process. The second authentication process may be executed by the second user device 112 and may be executed similarly to the execution of the authentication process described above with respect to the first user device 102 and the first user.

Upon determining that the desired payment transactions are authorized (e.g., receiving respective authorization indications from the first user device 102 and the second user device 112), the payment application 104 may proceed with processing the desired payment transaction. According to a particular embodiment, the payment application 104 may determine first account information corresponding to the first user and second account information corresponding to the second user. Determining the first account information and the second account information may include determining a first registration status corresponding to the first user and a second registration status corresponding to the second user. The first registration status may indicate whether the first user is registered with the PSP (e.g., whether the first user is registered with a first account provided by the PSP). Similarly, the second registration status may indicate whether the second user is registered with the PSP (e.g., whether the second user is registered with a second account provided by the PSP). The first registration status may be determined based on first contact information associated with the first user. Similarly, the second registration status may be determined based on second contact information associated with the second user. The first contact information and second contact information may include, but are not limited to, phone numbers, email addresses, social security numbers, driver license numbers, passport numbers, and/or social media accounts corresponding to the first user and the second user, respectively.

In other embodiments, the first registration status may be determined (e.g., via the payment application 104) based on login credentials provided by the first user. For example, the payment application 104 may generate a request for the first user to input the login credentials at the time of initializing the payment application 104. As another example, the login credentials may be provided and/or included in the authentication process described above with respect to authentication the first user device 102 with the first user. It will be appreciated that login credentials may include username and password information, biometric information (e.g., fingerprint information, voice information, optical scanning information, etc.), and/or other types of credential information. Similarly, the payment application 104 may also determine the second registration status of the second user based on login credentials corresponding to the second user.

In certain embodiments, the first registration status may indicate that the first user is registered with the PSP, and the second registration status may indicate that the second user is unregistered with the PSP. As a result of determining that the second user is unregistered with the PSP, the payment application 104 may transmit a request to the second user device 112 for the second user to register with the PSP (e.g., open and/or register an account with the PSP). In response to the request, the payment application 104 may receive a registration response from the second user device 112. If the registration response indicates that the second user has declined to register with the PSP, the payment application 104 may transmit, to the second user device 112, a second request for the second user to input account information associated with a financial account corresponding to the second user. The second request may be transmitted via a push notification, a text message, electronic mail, and/or any other type of communication.

Upon determining the first account information and the second account information, the payment application 104 may cause a remittance and/or a transfer of the payment amount between a first account corresponding to the first account information and a second account corresponding to the second account information. In certain embodiments, the payment application 104 may provide the first account information, the second account information, and the payment amount to the payment service provider computer 134. As described in further detail below, the payment service provider computer 134 may include a payment processing application that is configured to transfer the payment amount between the first account and the second account based on the first account information and the second account information.

According to other embodiments, the first registration status may indicate that the first user is registered with the PSP, and the second registration status may indicate that the second user is also registered with the PSP. As such, the first account information may correspond to a first account with the PSP, and the second account information may correspond to a second account with the PSP. As such, the payment application 104 may cause a transfer of the payment amount between the first account and the second account. Because the first account and the second account are provided by the PSP, the transfer may be referred to as a closed-loop payment transaction corresponding to the PSP.

The first user device 102 may execute the other applications 106 to perform various other tasks and/or operations corresponding to the first user device 102. For example, the other applications 106 may include security applications for implementing client-side security features, programmatic client applications for interfacing with appropriate application programming interfaces (APIs) over network 150, or other types of applications. The other applications 106 may also include additional communication applications, such as email, texting, voice, and instant messaging (IM) applications that enable a user to send and receive emails, calls, texts, and other notifications through the network 150. In various embodiments, the other applications 106 may include location detection applications, such as a mapping, compass, and/or global positioning system (GPS) applications, which may be used to determine a location of the first user device 102. The other applications may 106 include social networking applications. Additionally, the other applications 106 may include device interfaces and other display modules that may receive input and/or output information. For example, the other applications 106 may include a graphical user interface (GUI) configured to provide an interface to the user. The other applications 106 may also include speech analysis applications, as described above, to translate the one or more audio streams into computer-readable data.

The first user device 102 may further include a database 108, which may be stored in a memory and/or other storage device of the first user device 102. The database 108 may include, for example, identifiers (IDs) such as operating system registry entries, cookies associated with the payment application 104 and/or other applications 106, IDs associated with hardware of the communication component 110, IDs used for payment/user/device authentication or identification, and/or other appropriate IDs. The database 108 may also include information corresponding to one or purchase transactions of customers who have purchased goods or services from a merchant, browsing histories of the customers, or other types of customer information. In certain embodiments, the first user device 102 may also include information corresponding to payment tokens, such as payment tokens generated by the second user device 112 and/or generated by the payment service provider computer 134. Further, the database may store login credentials, contact information, biometric information, authentication information, and/or trigger word information.

The first user device 102 may also include at least one communication component 110 configured to communicate with various other devices such as the second user device 112, and/or the payment service provider computer 134. In various embodiments, communication component 110 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth, Bluetooth low-energy, near field communication (NFC) devices, and/or the like.

The second user device 112 may be maintained, for example, by a third-party service provider, which may provide payment processing services for the merchant. As such, the second user device 112 may also include a payment application 114. The payment application 114 may execute similar operations to those executed by the payment application 104 included in the first user device 102. The operations executed by the payment application 114 may be executed with respect to the second user device 112 and/or the second user instead of the first user device 102 and/or the first user. For example, The second user device 112 may execute the other applications 116 to perform various other tasks and/or operations corresponding to the second user device 112. For example, the other applications 116 may include security applications for implementing client-side security features, programmatic client applications for interfacing with appropriate APIs over the network 150, or other types of applications. The other applications 116 may also include additional communication applications, such as email, texting, voice, and IM applications that enable communication of emails, calls, texts, and other notifications through the network 150. In various embodiments, the other applications 116 may include location detection applications, such as a mapping, compass, and/or GPS applications, which may be used to determine a location of the second user device 112. The other applications may 116 include social networking applications. Additionally, the other applications 116 may include device interfaces and other display modules that may receive input and/or output information. For example, the other applications 116 may include a GUI configured to provide an interface to one or more users.

The second user device 112 may further include a database 118, which may be stored in a memory and/or other storage device of the second user device 112. The database 118 may include, for example, IDs such as operating system registry entries, cookies associated with the payment processing application 114 and/or other the applications 116, IDs associated with hardware of the communications components 120, IDs used for payment/user/device authentication or identification, and/or other appropriate IDs.

In various embodiments, the second user device 112 also includes at least one communications component 120 that is configured to communicate with the first user device 102, the second user device 112, and/or the payment service provider computer 134 via the network 150. For example, according to a particular embodiment, the first user device 102 and the second user device 112 may communicate via the communications component 120, as described in further detail below. Further, the communications component 120 may comprise a DSL modem, a PSTN modem, an Ethernet device, a broadband device, a satellite device and/or various other types of wired and/or wireless network communication devices including microwave, RF, and IR communication devices.

The payment service provider computer 134 may be maintained, for example, by a service provider, which may provide payment processing services for the merchant. In one example, the payment service provider computer 134 may be provided by PAYPAL®, Inc. of San Jose, Calif., USA. However, in other embodiments, the payment service provider computer 134 may be maintained by or include a financial service provider, social networking service, email or messaging service, media sharing service, and/or other service provider, which may provide payment processing services. The payment service provider computer 134 includes one or more payment processing applications 136, which may be configured to process payment information received from the first user device 102 and/or the second user device 112. For example, the payment application 104 of the first user device 102 may receive first account information corresponding to the first user in order to transfer payment to a second account corresponding to the second user of the second user device 112. The first user device 102 may transmit the first account information to the payment processing application 136, which may cause payment to be transferred from the first account to the second account based at least in part on the first account information. As another example, the payment application 104 of the first user device 102 may receive payment information from a customer to purchase a service or good offered by the merchant. Upon receipt of the payment information, the payment application 104 may transmit the payment information to the payment service provider computer 134. The payment processing application 136 of the payment service provider computer 134 may receive and process the payment information.

The payment service provider computer 134 may also include a payment monitoring application 138. The payment monitoring application 138 may include similar functionality as the payment application 104 included in the first user device 102 and as the payment application 114 included in the second user device 112. For example, the payment monitoring application 138 may be configured to monitor the real-time voice communication between the first user of the first user device 102 and the second user of the second user device 112. According to a particular embodiment, the network interface component 146 may receive, from the first user device 102, a first audio stream corresponding to voice communication from the first user. The network interface component 146 may also receive, from the second user device 112, a second audio stream corresponding to voice communication from the second user. Similar to the functionality of the payment application 104, the payment monitoring application 138 may identify a set of words spoken during the real-time voice communication between the first user and the second user based on the first audio stream and the second audio stream. Based on the identified set of words, the payment monitoring application 138 may determine whether there is a desired payment transaction between the first user and the second user.

If the payment monitoring application 138 determines that there is a desired payment transaction, the payment monitoring application 138 may also determine (based on the identified set of words), a payment sender and a payment recipient corresponding to the desired payment transaction. Further, the payment monitoring application 138 may determine a payment amount to be transferred between the first user and the second user. As described above, the payment amount may be determined based on the identified set of words or based on an amount input by the first user and/or the second user. In certain embodiments, the payment monitoring application 138 may transmit a request for the payment amount to the payment sender. For instance, if the payment monitoring application 138 identifies the first user as the payment sender, the payment monitoring application 138 may send the request for the payment amount to the first user device 102. In other embodiments, the payment monitoring application 138 may transit the request for the payment amount to the payment recipient. For instance, if the payment monitoring application 138 identifies the second user as the payment recipient, the payment monitoring application 138 may send the request for the payment amount to the second user device 112.

Similar to the payment application 104, before commencing a transfer of the payment amount between the first user and the second user, the payment monitoring application 138 may be configured to obtain authorization indications from the first user and the second user, respectively, that indicate the transfer of the payment amount is authorized. For instance, after determining the payment sender, the payment recipient, and the payment amount, the payment monitoring application 138 may transmit a first authorization request to the first user device 102 for the first user's authorization to proceed with the desired payment transaction. The payment monitoring application 138 may also transmit a second authorization request to the second user device 112 for the second user's authorization to proceed with the desired payment transaction.

In response to the first authorization request, the payment monitoring application 138 may receive a first authorization indication from the first user device 102. Further, the payment monitoring application 138 may determine whether the first authorization indication is valid. The payment monitoring application 138 may determine that the first authorization indication is valid if the payment monitoring application 138 determines that the first authorization indication is received during a period of time in which the first user device 102 is authenticated with the first user. In other embodiments, the first authorization indication may also indicate that the first user device 102 is authenticated with respect to the first user. The first user device 102 may be authenticated with the first user based on biometric information and other information, as described above with reference to execution of the authentication process performed by the first user device 102. If the payment monitoring application 138 determines that the first authorization indication is invalid, the payment monitoring application 138 may transmit another authorization request to the first user device 102. In certain embodiments, after the payment monitoring application 138 receives a predetermined number of invalid authorization indications from the first user device 102, the payment monitoring application 138 may cancel processing of the desired payment transaction.

In response to the second authorization request, the payment monitoring application 138 may receive a second authorization indication from the first user device 102. Further, the payment monitoring application 138 may determine whether the second authorization indication is valid. For instance, the payment monitoring application 138 may determine that the second authorization indication is valid if the payment monitoring application 138 determines that the second authorization indication is received during a period of time in which the second user device 112 is authenticated with second first user. In other embodiments, the second authorization indication may also indicate that the second user device 112 is authenticated with respect to the second user. The second user device 112 may be authenticated with the second user based on biometric information and other information, as described above with reference to the operation of the second authentication process performed by the second user device 112. If the payment monitoring application 138 determines that the second authorization indication is invalid, the payment monitoring application 138 may transmit another authorization request to the second user device 112. In certain embodiments, after the payment monitoring application 138 receives a predetermined number of invalid authorization indications from the second user device 112, the payment monitoring application 138 may cancel processing of the desired payment transaction.

Upon determining that the desired payment transaction is authorized by the first user and the second user (e.g., based on receiving the first authorization indication and the second authorization indication), the payment monitoring application 138 may determine first account information associated with the first user and second account information associated with the second user. As described above, determining the first account information may include determining a first registration status corresponding to the first user. Similarly, determining the second account information may include determining a second registration status corresponding to the second user. The first registration status may indicate whether the first user has an account with the PSP, and the second registration status may indicate whether the second user has an account with the PSP.

According to a particular embodiment, the payment monitoring application 138 may determine, based on the first registration status, that the first user is already registered with a first account with the PSP. Under this scenario, determining the first account information may include accessing the account information associated with the registered first account of the first user.

According to another embodiment, the payment monitoring application 138 may determine, based on the first registration status, that the first user is unregistered with the PSP. As a result, the payment monitoring application 138 may transmit a registration request to the first user device 102 for the first user to register an account with the PSP. The payment monitoring application 138 may receive, from the first user device 102 a registration response in response to the registration request. In certain implementations, the registration response may indicate that the first user has registered with a first account with the PSP. Under this scenario, determining the first account information corresponding to the first user may include accessing account information associated with the first account. In other implementations, the registration response may indicate that the user declines to register with the PSP. As a result, the payment monitoring application 138 may transmit another request to the first user device 102 for third-party account information corresponding to a third-party account of the first user. The third-party account information may include credit card information, checking account and routing information, Automatic Clearinghouse (ACH) information, and/or other types of financial information that can be used to remit payment. Under this scenario, determining the first account information may include determining the third-party account information associated with the first user. Thus, depending on the situation, the first account information may correspond to an account provided by the payment service provider or by a third-party service provider, such as a bank, credit union, and/or any other type of financial institution.

According to a particular embodiment, the payment monitoring application 138 may determine, based on the second registration status, that the second user is already registered with a second account with the PSP. Under this scenario, determining the second account information may include accessing the account information associated with the registered second account of the second user.

According to another embodiment, the payment monitoring application 138 may determine, based on the second registration status, that the second user is unregistered with the PSP. As a result, the payment monitoring application 138 may transmit a registration request to the second user device 112 for the second user to register an account with the PSP. The payment monitoring application 138 may receive, from the second user device 112 a registration response in response to the registration request. In certain implementations, the registration response may indicate that the second user has registered with a second account with the PSP. Under this scenario, determining the second account information corresponding to the second user may include accessing account information associated with the second account. In other implementations, the registration response may indicate that the user declines to register with the PSP. As a result, the payment monitoring application 138 may transmit another request to the second user device 112 for third-party account information corresponding to a third-party account of the second user. The third-party account information may include credit card information, checking account and routing information, Automatic Clearinghouse (ACH) information, and/or other types of financial information that can be used to remit payment. Under this scenario, determining the second account information may include determining the third-party account information associated with the second user. Thus, depending on the situation, the second account information may correspond to an account provided by the payment service provider or by a third-party service provider, such as a bank, credit union, and/or any other type of financial institution Upon determining the first account information and the second account information, the payment monitoring application 138 may provide the first account information, the second account information, and the payment amount corresponding to the desired payment transaction to the payment application processing application 136. The payment application processing application 136 may be configured to transfer the payment amount between a first account associated with the first account information and a second account associated with the second account information. The transfer may be based on the identified payment sender and the identified payment recipient corresponding to the desired payment transaction.

In certain embodiments, the payment monitoring application 138 may also be configured to determine whether a payment application provided by the PSP is stored on a user device, such as in response to determining a desired payment transaction between a user of the user device and another user. For example, after determining the payment transaction between the first user and the second user, the payment monitoring application 138 may determine that the second user device 112 does not store the payment application 114. As such, the payment monitoring application 138 may transmit a download request to the second user device 112 to request the second user to download the payment application 114, such as from a designated app store.

The payment service provider computer 134 may further include a database 142, which may be stored in a memory and/or other storage device of the payment service provider computer 134. The database 142 may include, for example, IDs such as operating system registry entries, cookies associated with the payment processing application 136, biometric information, IDs associated with hardware of the network interface component 146, IDs used for payment/user/device authentication or identification, and/or other appropriate IDs.

In various embodiments, the payment service provider computer 134 also includes at least one network interface component 146 that is configured to communicate with the first user device 102 and/or the second user device 112 via the network 150. For example, according to a particular embodiment, the payment service provider computer 134 may receive voice communication information from the first user device 102 and the second user device 112 via the network interface component 146. The network interface component 146 may comprise a DSL modem, a PSTN modem, an Ethernet device, a broadband device, a satellite device and/or various other types of wired and/or wireless network communication devices including microwave, RF, and IR communication devices.

The network 150 may be implemented as a single network or a combination of multiple networks. For example, in various embodiments, the network 150 may include the Internet or one or more intranets, landline networks, wireless networks, and/or other appropriate types of networks. Thus, the network 150 may correspond to small scale communication networks, such as a private or local area network, or a larger scale network, such as a wide area network or the Internet, accessible by the various components of system 100.

Figure 2:
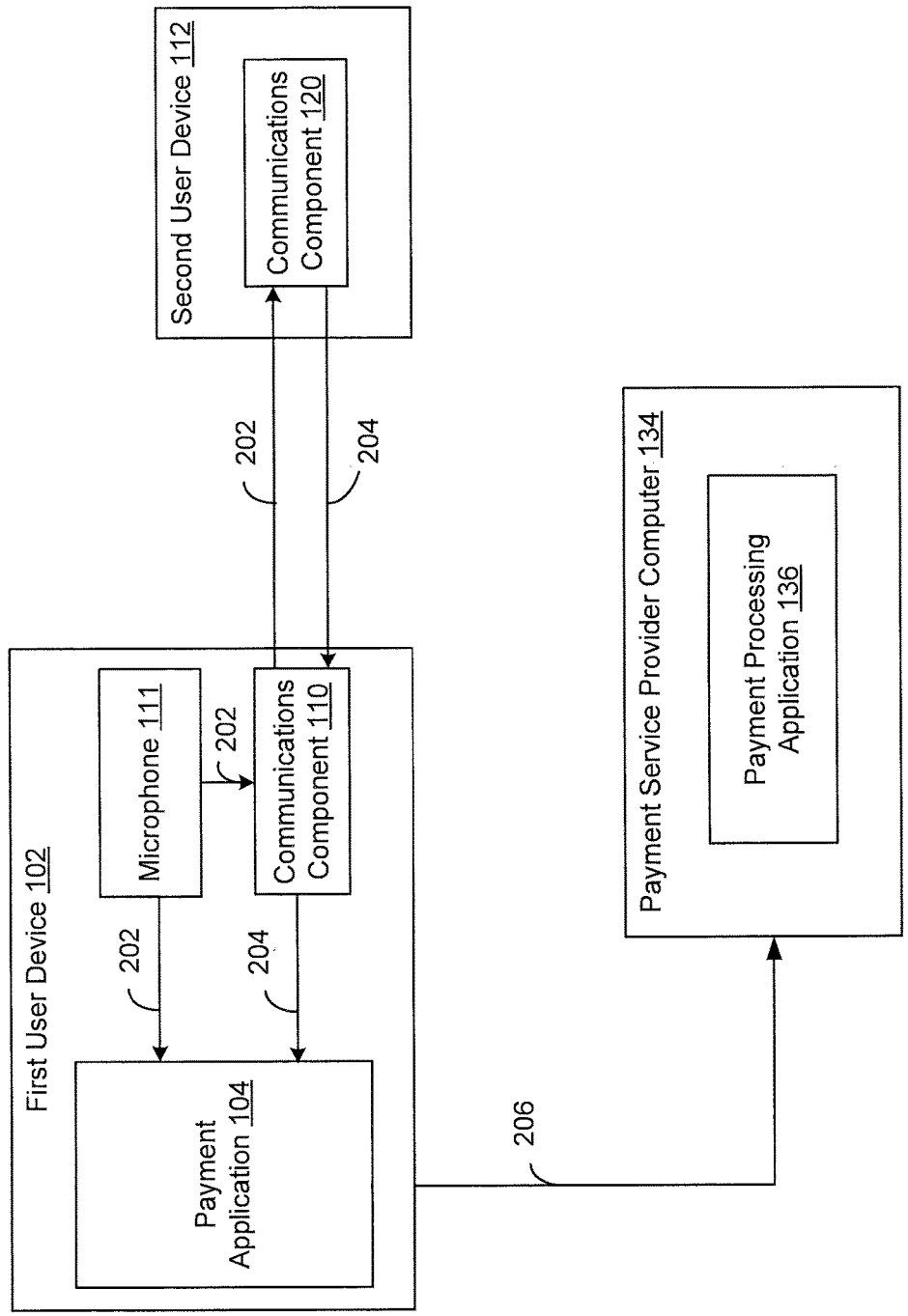
FIG. 2 is an example data flow diagram for voice activated remittances, according to an embodiment.

Referring now to FIG. 2, a data flow diagram depicting a data flow 200 between the various components of FIG. 1 is provided in accordance with a particular embodiment. As shown in FIG. 2, microphone 111 of the first user device 102 may provide a first audio stream 202 to the payment application 104 and the communications component 110. For instance, the first audio stream 202 may correspond to a first voice communication of a first user, and the first voice communication may be received at the first user device 102 via the microphone 111. The first audio stream 202 may be transmitted, via the communications component 110, to the communications component 120 of the second user device 112. Additionally, a second audio stream 204 may be transmitted by the communications component 120 of the second user device 112 to the communications component 110 of the first user device 102. The communications component 110 of the first user device 102 may provide the second audio stream to the payment application 104. The second audio stream may correspond to a second voice communication of a second user of the second user device 112. Further, the combination of the first audio stream and the second audio stream may correspond to a real-time voice communication between the first user and the second user.

As described above with reference to FIG. 1, based on the first audio stream and the second audio stream, the payment application 104 may determine a set of words spoken during the real-time voice communication. In certain embodiments, the set of words may indicate a desired payment transaction between the first user and the second user. Based on the set of words, inputs received from the first user, and/or further communication between the first user device 102 and the second user device 112, the payment application 104 may determine a payment amount, a payment recipient, and a payment sender corresponding to the desired payment transaction. The payment application 104 may further determine first account information corresponding to the first user and second account information corresponding to the second user.

Further, a payment transfer request 206 may be transmitted by the first user device 102 to the payment service provider computer 134. The payment transfer request 206 may the payment amount, first account information, and the second account information. The payment transfer request 206 may also indicate which of the first account information and the second account information corresponds to the payment recipient and the payment sender, respectively. Additionally, the payment transfer request 206 may be provided to the payment processing application 136 of the payment service provider computer 134. The payment processing application 136 may be configured to cause the payment amount to be transferred between a first account corresponding to the first account information and a second account corresponding to the second account information.

Figure 3:
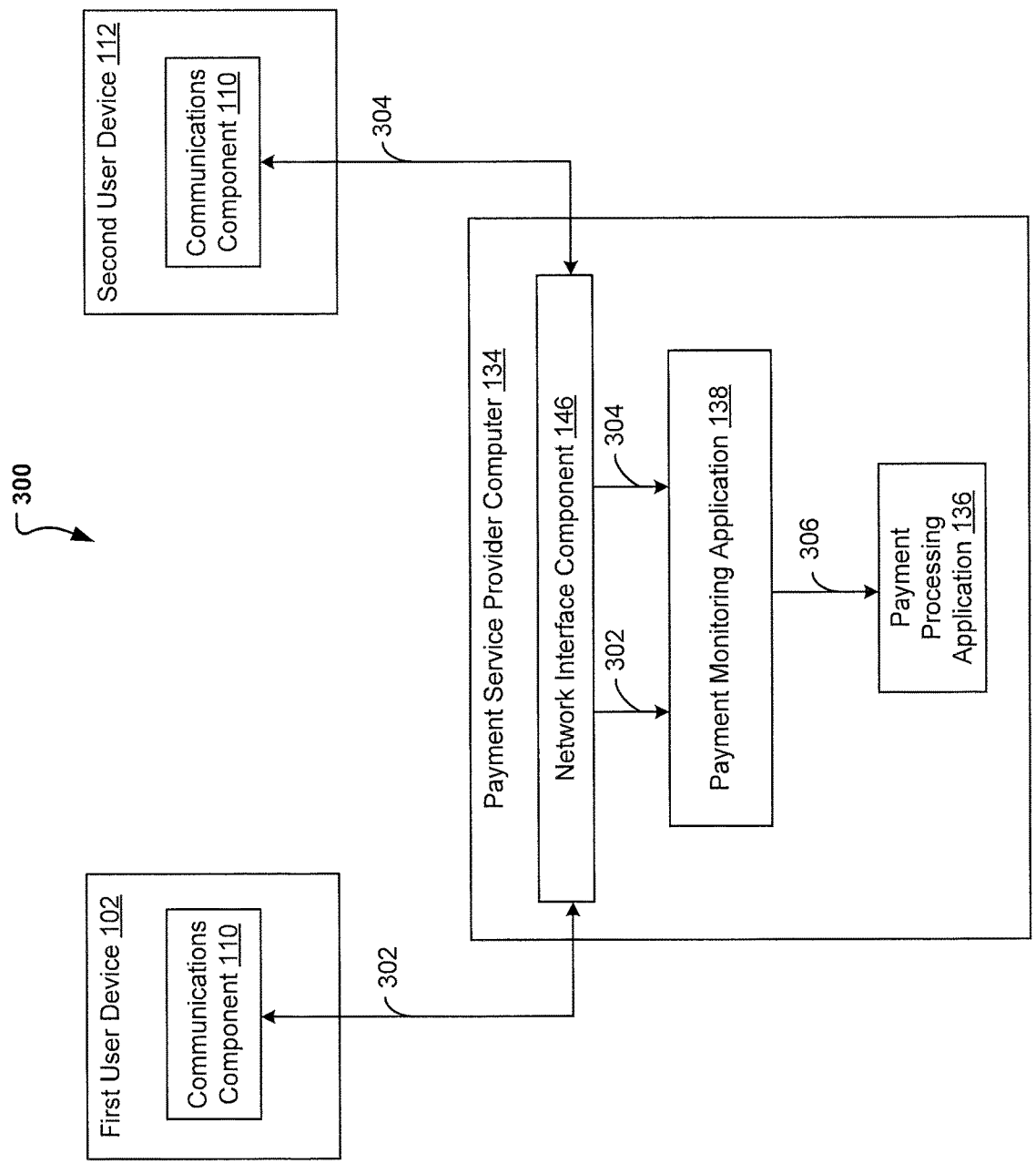
FIG. 3 is an example data flow diagram for voice activated remittances, according to another embodiment.

Referring now to FIG. 3, a data flow diagram depicting a data flow 300 between the various components of FIG. 1 is provided in accordance with another particular embodiment. As shown in FIG. 3, the first user device 102 may transmit, via the communications component 110, a first audio stream 302 to the network interface component 146 of the PSP. The first audio stream may correspond to a first voice communication of a first user of the first user device 102. Additionally, the second user device 112 may transmit, via the communications component 120, a second audio stream to the network interface component 146 of the PSP. The second audio stream may correspond to a second voice communication of a second user of the second user device 112.

In certain embodiments, the first audio stream 302 and the second audio stream 304 may be provided to the payment monitoring application 138 of the payment service provider computer 134. The combination of the first audio stream 302 and the second audio stream 304 may correspond to a real-time voice communication between a first user of the first user device 102 and a second user of the second user device 112. Further, based on the first audio stream 302 and the second audio stream 304, the payment monitoring application 138 may identify a set of words spoken during the real-time voice communication. The set of words may indicate a desired payment transaction between the first user and the second user.

Based on the set of words, inputs received from the first user, and/or further communication from the first user device 102 and the second user device 112, the payment monitoring application 138 may determine a payment amount, a payment recipient, and a payment sender corresponding to the desired payment transaction. The payment monitoring application 138 may further determine first account information corresponding to the first user and second account information corresponding to the second user.

Further, a payment transfer request 306 may be transmitted by the payment monitoring application 138 to the payment processing application 136. The payment transfer request 306 may the payment amount, first account information, and the second account information. The payment transfer request 306 may also indicate which of the first account information and the second account information corresponds to the payment recipient and the payment sender, respectively. The payment processing application 136 may be configured to cause the payment amount to be transferred between a first account corresponding to the first account information and a second account corresponding to the second account information.

Figure 4:
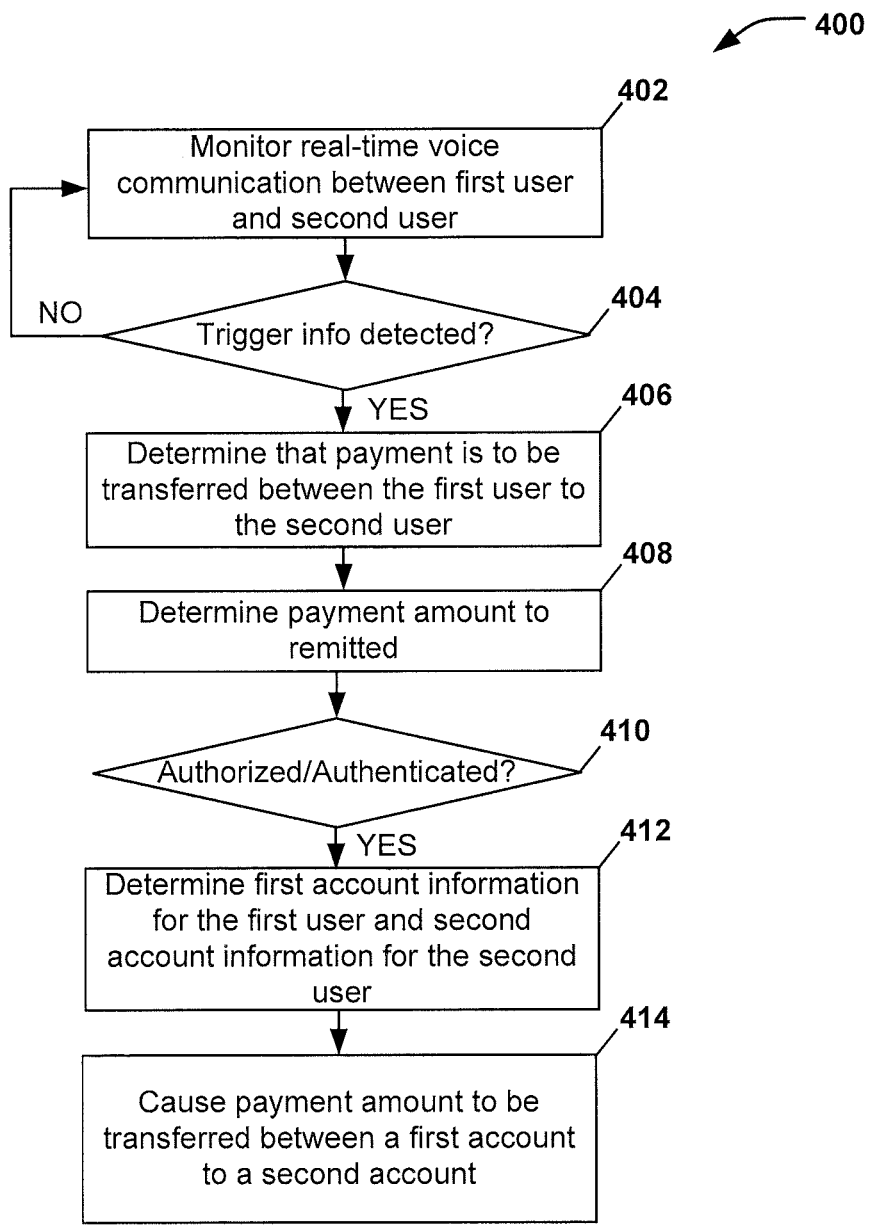
FIG. 4 is an example process flowchart for voice activated remittances, according to an embodiment.

Referring now to FIG. 4, a flow diagram of a method 400 for facilitating voice activated remittances is provided in accordance with a particular embodiment. In certain embodiments, the method 400 may be performed by one or more components of the system 100 of FIG. 1, such as the payment application 104 and/or the payment monitoring application 138 of the payment service provider computer 134. Note that one or more steps, processes, and methods described herein may be omitted, performed in a different sequence, or combined as desired or appropriate.

At step 402, a real-time voice communication may be monitored between a first user and a second user. For example, the system 100 may monitor at least one audio stream corresponding to the real-time voice communication. In certain embodiments, the system 100 may identify a set of words spoken during the real-time voice communication.

At step 404, the system may determine if the set of words correspond to trigger information. The trigger information may indicate a desired payment transaction between the first user and the second user. For example, words that include numbers, words such as "pay," "owe," "money," "dollars", phrases such as "can you send me money?," and/or other words or phrases may correspond to the trigger information. If no trigger information is detected, the method 400 may proceed back to step 402 and continue monitoring the real-time voice communication. If trigger information is detected, the method 400 may proceed to step 406.

At step 406, the system 100 may determine that payment is to be transferred between the first user and the second user. In certain embodiments, the system 100 may determine which of the first user and the second user corresponds to a payment sender or a payment recipient, respectively.

At step 408, the system 100 may determine a payment amount to be remitted between the first user and the second user. As described above, the payment amount may be determined based on the identified set of words spoken during the real-time voice communication or based on input from the first user or the second user.

At step 410, the system 100 may determine whether the desired payment transaction is authorized and/or authenticated by the first user and/or the second user. For example, as described above, the system 100 determine whether a first authorization indication is received from the first user device 102 during a period of time in which the first user device 102 is authenticated with respect to the first user. Similarly, the system 100 may also determine whether a second authorization indication is received from the second user device 112 during a period of time in which the second user device 112 is authenticated with respect to the second user. If the system 100 determines that desired payment transaction is not authorized or authenticated by the first user or the second user, the method 400 may end and the desired payment transaction may be canceled. If the system 100 determines that desired payment transaction is authorized or authenticated, the method 400 may proceed to step 412.

At step 412, the system 100 may determine first account information corresponding to the first user and second account information corresponding to the second user. The first account information may be associated with a first account of the first user and the second account information may be associated with a second account of the second user.

At step 414, the system 100 may cause the payment amount to be transferred between the first account and the second account.

Figure 5:
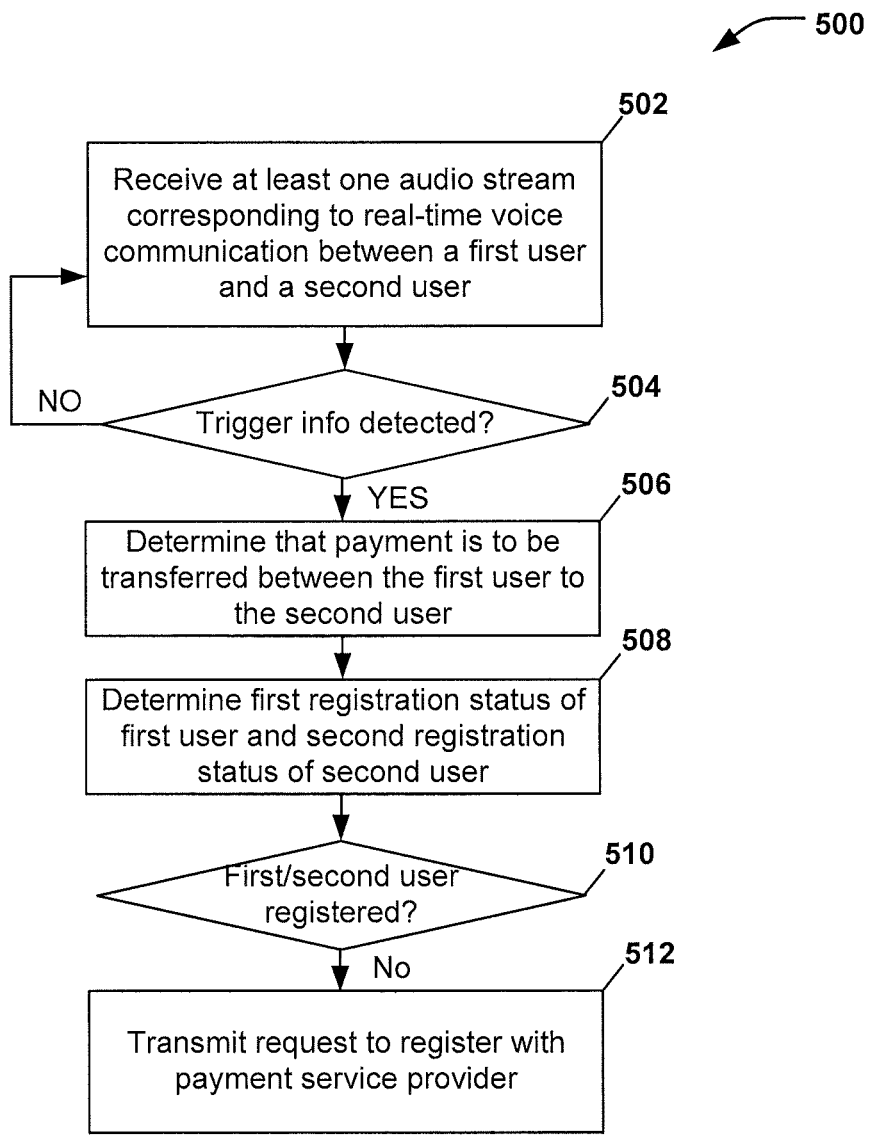
FIG. 5 is an example process flowchart for voice activated remittances, according to another particular embodiment.

Referring now to FIG. 5, a flow diagram of a method 500 for facilitating voice activated remittances is provided in accordance with another particular embodiment. In certain embodiments, the method 500 may be performed by one or more components of the system 100 of FIG. 1, such as the payment application 104 and/or the payment monitoring application 138 of the payment service provider computer 134. Note that one or more steps, processes, and methods described herein may be omitted, performed in a different sequence, or combined as desired or appropriate.

At step 502, the system may receive at least one audio stream corresponding to a real-time voice communication between a first user and a second user. In certain embodiments, the system 100 may identify a set of words spoken during the real-time voice communication.

At step 504, the system may determine if the set of words correspond to trigger information. The trigger information may indicate a desired payment transaction between the first user and the second user. For example, words that include numbers, words such as "pay," "owe," "money," "dollars", phrases such as "can you send me money?," and/or other words or phrases may correspond to the trigger information. If no trigger information is detected, the method 500 may proceed back to step 502 and continue monitoring the real-time voice communication. If trigger information is detected, the method 500 may proceed to step 506.

At step 506, the system 100 may determine that payment is to be transferred between the first user and the second user.

At step 508, the system 100 may determine a first registration status corresponding to the first user and a second registration status corresponding to the second user. As described above, the first registration status may indicate whether the first user is registered with a first account of a payment service provider. Similarly, the second registration status may indicate whether the second user is registered with a second account of the payment service provider.

At step 510, the system may determine if either of the first user or the second user is registered with the payment service provider based on the first registration status and the second registration status. If the first registration status or the second registration status indicates that the first user or the second user is unregistered with the payment service provider, the method 500 may proceed to step 512.

Figure 6:
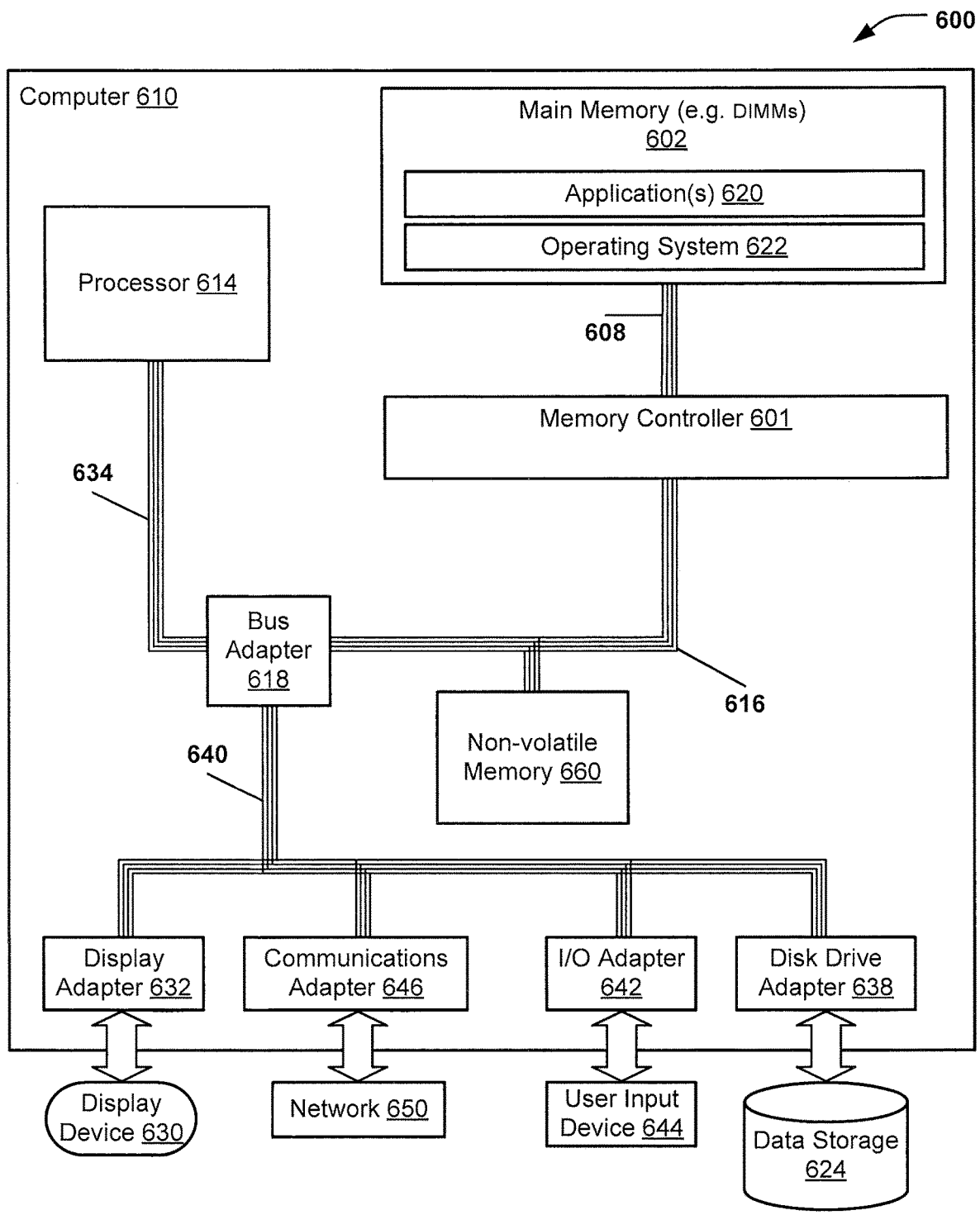
FIG. 6 is a block diagram of a computer system suitable for implementing one or more components in FIG. 1, FIG. 2, and/or FIG. 3, according to an embodiment.

At step 512, the system may transmit a request to register with the payment service provider to any of the first user or the second user that is unregistered with the payment service provider. For example, if the first registration status indicates that the first user is unregistered with the payment service provider, the system 100 may transmit a request to a user device associated with the first user (e.g., the first user device 102) to register with the payment service provider. Similarly, if the second registration status indicates that the second user is unregistered with the payment service provider, the system 100 may transmit another request to a user device associated with the second user (e.g., the second user device 112) to register with the payment service provider FIG. 6 is a block diagram of a computer system 6600 suitable for implementing one or more components in FIG. 1, according to an embodiment. Referring to FIG. 6, an illustrative system 600 including a computer 610 is shown. The computer 6610 may be an implementation of a computing system that includes or corresponds to the first user device 102, second user device 112, and/or payment service provider computer 134 of FIG. 1. The computer 610 includes at least one computer processor (CPU) 614 (e.g., a hardware processor) as well as main memory 602, a memory controller 601, and a non-volatile memory 560. The main memory 602 is connected through a memory bus 608 to the memory controller 601. The memory controller 601 and the non-volatile memory 560 are connected through a second memory bus 616 and a bus adapter 618 to the processor 614 through a processor bus 634.

Stored at the memory 602 is one or more applications 620 that may be a module or computer program instructions for carrying out particular tasks (e.g., payment applications 104, web browsers, payment processing application 136, payment monitoring application 138, of FIG. 1). Also stored at the main memory 602 is an operating system 622. Operating systems include, but are not limited to, UNIX® (a registered trademark of The Open Group), Linux® (a registered trademark of Linus Torvalds), Windows® (a registered trademark of Microsoft Corporation, Redmond, Wash., United States), and others as will occur to those of skill in the art. The operating system 622 and the application 620 in the example of FIG. 5 are shown in the main memory 602, but components of the aforementioned software may also, or in addition, be stored at non-volatile memory (e.g., on data storage, such as data storage 624 and/or the non-volatile memory 560).

The computer 610 includes a disk drive adapter 638 coupled through an expansion bus 640 and the bus adapter 618 to the processor 614 and other components of the computer 610. The disk drive adapter 638 connects non-volatile data storage to the computer 610 in the form of the data storage 624 and may be implemented, for example, using Integrated Drive Electronics ("IDE") adapters, Small Computer System Interface ("SCSI") adapters, Serial Attached SCSI ("SAS") adapters, and others as will occur to those of skill in the art. Non-volatile computer memory also may be implemented as an optical disk drive, electrically erasable programmable read-only memory (so-called "EEPROM" or "Flash" memory), RAM drives, and other devices, as will occur to those of skill in the art. In a particular embodiment, the data storage 624 may store the data and information described herein.

The computer 610 also includes one or more input/output ("I/O") adapters 642 that implement user-oriented input/output through, for example, software drivers and computer hardware for controlling input and output to and from user input devices 644, such as keyboards and mice. In addition, the computer 610 includes a communications adapter 646 for data communications with a data communications network 660. The data communications may be carried out serially through Recommended Standard 232 (RS-232) connections (sometimes referred to as "serial" connections), through external buses such as a Universal Serial Bus ("USB"), through data communications networks such as internet protocol (IP) data communications networks, and in other ways as will occur to those of skill in the art. The communications adapter 646 implements the hardware level of data communications through which one computer sends data communications to another computer, directly or through a data communications network. Examples of the communications adapter 646 suitable to use in the computer 610 include, but are not limited to, modems for wired dial-up communications, Ethernet (Institute of Electrical and Electronics Engineers (IEEE) 802.3) adapters for wired network communications, and IEEE 802.11 adapters for wireless network communications. The computer 610 also includes a display adapter 632 that facilitates data communication between the bus adapter 618 and a display device 630, enabling the application 620 to visually present output on the display device 630.

In various embodiments of the present disclosure, execution of instruction sequences to practice the present disclosure may be performed by computer system 600. In various other embodiments of the present disclosure, a plurality of computer systems 600 coupled by communications adapter 646 to the network (e.g., such as a LAN, WLAN, and/or various other wired or wireless networks, including telecommunications, mobile, and cellular phone networks) may perform instruction sequences to practice the present disclosure in coordination with one another.

Particular embodiments described herein may take the form of an entirely hardware embodiment, an entirely software embodiment, or an embodiment containing both hardware and software elements. In a particular embodiment, the disclosed methods are implemented in software that is embedded in processor readable storage medium or storage device and executed by a processor that includes but is not limited to firmware, resident software, microcode, etc.

Further, embodiments of the present disclosure, may take the form of a computer program product accessible from a computer-usable or computer-readable storage device providing program code (e.g., computer-executable instructions) for use by or in connection with a computer, processor, or any instruction execution system. For the purposes of this description, a computer-usable or computer-readable storage device may be non-transitory and can be any apparatus that can tangibly embody a computer program and that can contain, store, communicate, propagate, or transport the program for use by or in connection with the instruction execution system, processor, apparatus, or device.

In various embodiments, the medium can include an electronic, magnetic, optical, electromagnetic, infrared, or semiconductor system (or apparatus or device) or a propagation medium. Examples of a computer-readable storage device include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements can include local memory employed during actual execution of the program code, bulk storage, and cache memories that may provide temporary or more permanent storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

What is claimed is:

1. A device, comprising:
 a microphone configured to receive a first voice communication corresponding to a first user of the device;
 a transceiver configured to receive, from a second device, a second voice communication corresponding to a second user of the second device;
 at least one processor; and
 a non-transitory memory storing computer-executable instructions, the computer-executable instructions being executable by the at least one processor to cause the device to perform operations comprising:
  monitoring a real-time voice communication, wherein the real-time voice communication comprises a combination of the first voice communication received by the microphone and the second voice communication received by the transceiver;
  performing a speech analysis on the real-time voice communication to translate the real-time voice communication into computer-readable data having a text translation format;
  identifying a set of words of the real-time voice communication based on the computer-readable data;
  determining the set of words of the real-time voice communication corresponds to a set of stored trigger words that indicate a desired payment transaction between the first user and the second user, wherein the determining the set of words comprises:
   accessing a database having stored trigger words;
   comparing the set of words to the stored trigger words in the database; and
   determining a similarity value between the set of words and the set of stored trigger words, wherein the similarity value exceeds a threshold indicating the payment transaction between the first user and the second user;
  identifying, based on the set of words, a payment sender and a payment recipient;
  determining a payment amount to be remitted from the payment sender to the payment recipient;
  determining first account information corresponding to the first user and second account information corresponding to the second user; and
  causing the payment amount to be transferred between a first financial account corresponding to the first account information to a second financial account corresponding to the second account information based on the payment sender and the payment recipient.

2. The device of claim 1, wherein the operations further comprise:
 determining that the device is authenticated with the first user.

3. The device of claim 2, wherein the determining that the device is authenticated with the first user comprises:
 receiving input biometric information corresponding to the first user;
 determining, based on a comparison between the input biometric information with previously stored biometric information corresponding to the first user, a biometric similarity value; and
 determining that the biometric similarity value is greater than a biometric similarity threshold.

4. The device of claim 2, wherein the determining that the device is authenticated with the first user comprises:
 determining, based on a comparison between the first voice communication and one or more previously stored voice communications corresponding to the first user, a voice similarity value; and
 determining that the voice similarity value is greater than a voice similarity threshold.

5. The device of claim 1, wherein the operations further comprise:
 transmitting, to the second device, an authorization request to proceed with the desired payment transaction; and
 receiving, from the second device in response to the authorization request, an authorization indication to proceed with the desired payment transaction.

6. The device of claim 5, wherein the operations further comprise:
 determining that the authorization indication is received during a period of time in which the second device is authenticated with respect to the second user.

7. The device of claim 1, wherein the causing the payment amount to be transferred comprises:
 transmitting, to a payment service provider computer, the first account information, the second account information, and the payment amount.

8. The device of claim 1, wherein the first voice communication and the second voice communication is between the first user and the second user.

9. The device of claim 1, wherein the set of words comprises at least one structure selected from the group consisting of a phrase and a sentence.

10. A method, comprising:
 receiving, by a microphone included in a device comprising one or more processors, a first voice communication corresponding to a first user of the device;
 receiving, by a transceiver included in the device, a second voice communication corresponding to a second user of a second device;
 monitoring a real-time voice communication, wherein the real-time voice communication comprises a combination of the first voice communication received by the microphone and the second voice communication received by the transceiver;
 performing a speech analysis on the real-time voice communication to translate the real-time voice communication into computer-readable data having a text translation format;
 identifying a set of words of the real-time voice communication based on the computer-readable data;
 determining the set of words of the real-time communication corresponds to a set of stored triggered words that indicate a desired payment transaction between the first user and the second user, wherein the determining the set of words comprises:
  accessing a database having stored trigger words;
  comparing the set of words to the stored trigger words in the database; and
  determining a similarity value between the set of words and the set of stored trigger words, wherein the similarity value exceeds a threshold indicating the payment transaction between the first user and the second user;

identifying, based on the set of words, a payment sender and a payment recipient;

determining a payment amount to be remitted from the payment sender to the payment recipient;

determining first account information corresponding to the first user and second account information corresponding to the second user; and causing the payment amount to be transferred between a first financial account corresponding to the first account information to a second financial account corresponding to the second account information based on the payment sender and the payment recipient.

11. The method of claim 10, further comprising:

determining that the device is authenticated with the first user.

12. The method of claim 11, wherein the determining that the device is authenticated with the first user comprises:

receiving input biometric information corresponding to the first user;

determining, based on a comparison between the input biometric information with previously stored biometric information corresponding to the first user, a biometric similarity value; and determining that the biometric similarity value is greater than a biometric similarity threshold.

13. The method of claim 11, wherein the determining that the device is authenticated with the first user comprises:

determining, based on a comparison between the first voice communication and one or more previously stored voice communications corresponding to the first user, a voice similarity value; and determining that the voice similarity value is greater than a voice similarity threshold.

14. The method of claim 10, further comprising:

transmitting, to the second device, an authorization request to proceed with the desired payment transaction; and receiving, from the second device in response to the authorization request, an authorization indication to proceed with the desired payment transaction.

15. The method of claim 14, further comprising:

determining that the authorization indication is received during a period of time in which the second device is authenticated with respect to the second user.

16. The method of claim 10, wherein the causing the payment amount to be transferred comprises:

transmitting, to a payment service provider computer, the first account information, the second account information, and the payment amount.

17. A non-transitory computer readable medium storing computer-executable instructions, that in response to execution by a device comprising one or more hardware processors, cause the device to perform operations comprising:

receiving, from a microphone included in the device, a first voice communication corresponding to a first user of the device;

receiving, from a transceiver included in the device, a second voice communication corresponding to a second user of a second device;

monitoring a real-time voice communication, wherein the real-time voice communication comprises a combination of the first voice communication received by the microphone and the second voice communication received by the transceiver;

performing a speech analysis on the real-time voice communication to translate the real-time voice communication into computer-readable data having a test translation format;

identifying a set of words of the real-time voice communication based on the computer-readable data, wherein the first voice communication and the second voice communication are concurrently received and analyzed in the identifying the set of words;

determining the set of words of the real-time voice communication corresponds to a set of stored trigger words that indicate a desired payment transaction between the first user and the second user, wherein the determining the set of words comprises:

accessing a database having stored trigger words;

comparing the set of words to the stored trigger words in the database; and determining a similarity value between the set of words and the set of stored trigger words, wherein the similarity value exceeds a threshold indicating the payment transaction between the first user and the second user;

identifying, based on the set of words, a payment sender and a payment recipient;

determining a payment amount to be remitted from the payment sender to the payment recipient;

determining first account information corresponding to the first user and second account information corresponding to the second user; and causing the payment amount to be transferred between a first financial account corresponding to the first account information to a second financial account corresponding to the second account information based on the payment sender and the payment recipient.

18. The non-transitory computer readable medium of claim 17, wherein the operations further comprise:

determining that the device is authenticated with the first user.

19. The non-transitory computer readable medium of claim 18, wherein the determining that the device is authenticated with the first user comprises:

receiving input biometric information corresponding to the first user;

determining, based on a comparison between the input biometric information with previously stored biometric information corresponding to the first user, a biometric similarity value; and determining that the biometric similarity value is greater than a biometric similarity threshold.

20. The device of claim 18, wherein the determining that the device is authenticated with the first user comprises:

determining, based on a comparison between the first voice communication and one or more previously stored voice communications corresponding to the first user, a voice similarity value; and determining that the voice similarity value is greater than a voice similarity threshold.

* * * * *